United States Patent
Tsuji

(10) Patent No.: US 9,571,740 B2
(45) Date of Patent: Feb. 14, 2017

(54) IMAGE RECOGNITION DEVICE THAT RECOGNIZES SPECIFIC OBJECT AREA, METHOD OF CONTROLLING THE DEVICE, AND STORAGE MEDIUM, AS WELL AS IMAGE PICKUP APPARATUS, AND DISPLAY DEVICE

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 13/871,188

(22) Filed: Apr. 26, 2013

(65) Prior Publication Data

US 2013/0286218 A1 Oct. 31, 2013

(30) Foreign Application Priority Data

Apr. 27, 2012 (JP) .................................. 2012-102870

(51) Int. Cl.
*H04N 5/00* (2011.01)
*H04N 5/232* (2006.01)

(52) U.S. Cl.
CPC ...... *H04N 5/23296* (2013.01); *H04N 5/23219* (2013.01)

(58) Field of Classification Search
CPC ............ G06K 9/00221; G06K 9/00248; G06K 9/00228; G06K 9/00268; G06K 9/00288; G06K 9/00295; G06K 9/00302; G06K 9/00275; G06K 9/00281; H04N 5/23219; H04N 5/23296

See application file for complete search history.

(56) References Cited

U.S. PATENT DOCUMENTS 5,550,928 A * 8/1996 Lu ..................... G06K 9/00221
                                                                382/103
7,139,411 B2 * 11/2006 Fujimura et al. ............. 382/103
(Continued)

FOREIGN PATENT DOCUMENTS

JP       2002-351380 A    12/2002
JP       2003-187352 A     7/2003
(Continued)

OTHER PUBLICATIONS

Iwata et al. "Application to the Security System of the Frontal Face Detection by the Four Directional Features Field," The Institute of Electrical Engineers Society article. IP, information processing Study Group 2002 (1), 19-24, Aug. 23, 2002. Cited in OA mailed Mar. 1, 2016 issued in counterpart Japanese Appln. No. 2012102870. Eng. abstract provided.

(Continued)

*Primary Examiner* — Brian Yenke
*Assistant Examiner* — Sean Haiem
(74) *Attorney, Agent, or Firm* — Rossi, Kimms & McDowell LLP

(57) ABSTRACT

An image recognition device capable of accurately recognizing an object by efficiently selecting a specific object area as a recognition target, from detected object areas. The image recognition device recognizes a specific object area from images sequentially input in time series. An object detection section detects object areas from each image. An appropriateness determination section determines whether or not each detected object area is appropriate as a recognition target. A recognition target-selecting section selects an object area for use as the recognition target, from the detected object areas, based on a result of determination by the appropriateness determination section. An image recognition device recognizes whether or not the object area (Continued)

selected by the recognition target-selecting section is the specific object area.

12 Claims, 5 Drawing Sheets

(56) References Cited

U.S. PATENT DOCUMENTS

| | | | |
|---|---|---|---|
| 7,315,631 B1 | 1/2008 | Corcoran et al. | |
| 7,483,548 B2* | 1/2009 | Nakano | G06K 9/00228 |
| | | | 382/103 |
| 9,224,034 B2 | 12/2015 | Steinberg et al. | |
| 2005/0265603 A1* | 12/2005 | Porter | G06K 9/00248 |
| | | | 382/190 |
| 2009/0092283 A1* | 4/2009 | Whillock | G06K 9/00771 |
| | | | 382/103 |
| 2010/0141786 A1* | 6/2010 | Bigioi | G06K 9/00288 |
| | | | 348/222.1 |
| 2012/0140994 A1* | 6/2012 | Yamada | G06F 21/32 |
| | | | 382/118 |
| 2012/0209514 A1* | 8/2012 | Chrysanthakopoulos | 701/431 |
| 2012/0293687 A1* | 11/2012 | Karn | H04N 5/23219 |
| | | | 348/231.99 |

FOREIGN PATENT DOCUMENTS

| | | |
|---|---|---|
| JP | 2008071172 A | 3/2008 |
| JP | 2008085491 A | 4/2008 |
| JP | 2009081714 A | 4/2009 |
| JP | 2009181556 A | 8/2009 |
| JP | 2010500836 A | 1/2010 |
| JP | 2010520684 A | 6/2010 |

OTHER PUBLICATIONS

Official Action issued in Japanese Appln. No. 2012102870 mailed Mar. 1, 2016.

* cited by examiner

IMAGE RECOGNITION DEVICE THAT RECOGNIZES SPECIFIC OBJECT AREA, METHOD OF CONTROLLING THE DEVICE, AND STORAGE MEDIUM, AS WELL AS IMAGE PICKUP APPARATUS, AND DISPLAY DEVICE

BACKGROUND OF THE INVENTION

Field of the Invention

The present invention relates to an image recognition device that recognizes a specific object image in an image, a method of controlling the same, and a storage medium, as well as an image pickup apparatus, and a display device.

Description of the Related Art

In recent years, some image pickup apparatuses are equipped with an object recognition function for recognizing a specific object image in images. The image pickup apparatuses equipped with the object recognition function are capable of performing focus control and exposure control preferentially on the recognized object image.

In the image pickup apparatus equipped with the object recognition function, first, an object image area including a specific object area is detected from image data obtained as a result of image pickup. Then, feature information for identifying the detected object image area as a recognition target is extracted. The extracted feature information is compared with feature information of registered target images registered in advance as dictionary data. Next, it is determined, based on the degree of similarity obtained by the comparison, to which registered target image the recognition target corresponds or whether or not there is no registered target image to which the recognition target corresponds.

For example, there has been proposed an image pickup apparatus in which when a specific object area is a human face, person recognition is performed by extracting feature information of a face area, and determining to which person an image of the face area corresponds (see Japanese Patent Laid-Open Publication No. 2003-187352).

By the way, in detecting an object area from image data obtained as a result of image pickup, if a plurality of object images exist in the image data, a plurality of object areas are detected as object image areas. In this case, the comparison of feature information for recognition of an object is performed by setting each of the object areas as a recognition target.

To this end, in the case where the plurality of object images exist in the image data obtained as the result of image pickup, if the number of recognition targets that can be set at a time is limited, it is necessary to select specific object areas from a plurality of object areas as recognition targets.

Further, the accuracy of object recognition, which is typified by person recognition, for identifying a human face is influenced by a facial expression and a face orientation in a face area, lighting conditions, etc. Therefore, when a state of a face area of a recognition target and a state of the corresponding face area in dictionary data are different, the accuracy of person recognition is sometimes lowered. In short, it is sometimes impossible to perform accurate person recognition, depending on the state of a face area as a recognition target.

SUMMARY OF THE INVENTION

The present invention provides an image recognition device which is capable of accurately recognizing an object by efficiently selecting a specific object area as a recognition target, from a plurality of detected object areas, a method of controlling the same, and a storage medium, as well as an image pickup apparatus, and a display device.

In a first aspect of the present invention, there is provided an image recognition device that recognizes a specific object area from images sequentially input in time series, comprising an object detection unit configured to detect object areas from each image, an appropriateness determination unit configured to determine whether or not each of the object areas detected by the object detection unit is appropriate as a recognition target, a selection unit configured to select an object area for use as the recognition target, from the object areas detected by the object detection unit, based on a result of determination by the appropriateness determination unit, and a recognition unit configured to recognize whether or not the object area selected by the selection unit is the specific object area.

In a second aspect of the present invention, there is provided an image pickup apparatus comprising an image pickup unit configured to photograph an object to thereby pick up images of the object, an image recognition device that recognizes a specific object area from the images sequentially input in time series from the image pickup unit, including an object detection unit configured to detect object areas from each image, an appropriateness determination unit configured to determine whether or not each of the object areas detected by the object detection unit is appropriate as a recognition target, a selection unit configured to select an object area for use as the recognition target, from the object areas detected by the object detection unit, based on a result of determination by the appropriateness determination unit, and a recognition unit configured to recognize whether or not the object area selected by the selection unit is the specific object area, and a control unit configured to control image pickup conditions for picking up images by the image pickup unit, according to the specific object area recognized by the image recognition device.

In a third aspect of the present invention, there is provided a display device comprising a display unit configured to display images input in time series, an image recognition device that recognizes a specific object area from the images sequentially input in time series from the image pickup unit, including an object detection unit configured to detect object areas from each image, an appropriateness determination unit configured to determine whether or not each of the object areas detected by the object detection unit is appropriate as a recognition target, a selection unit configured to select an object area for use as the recognition target, from the object areas detected by the object detection unit, based on a result of determination by the appropriateness determination unit, and a recognition unit configured to recognize whether or not the object area selected by the selection unit is the specific object area, and a control unit configured to control display conditions for displaying each image on the display unit according to the specific object area detected by the image recognition device.

In a fourth aspect of the present invention, there is provided a method of controlling an image recognition device that recognizes a specific object area from images sequentially input in time series, comprising detecting object areas from each image, determining whether or not each detected object area is appropriate as a recognition target, selecting an object area for use as the recognition target from the detected object areas based on a result of the determining, and recognizing whether or not the selected object area is the specific object area.

In a fifth aspect of the present invention, there is provided a non-transitory computer-readable storage medium storing a computer-executable control program for causing a computer to execute a method of controlling an image recognition device that recognizes a specific object area from images sequentially input in time series, wherein the method comprises detecting object areas from each image, determining whether or not each detected object area is appropriate as a recognition target, selecting an object area for use as the recognition target from the detected object areas based on a result of the determining, and recognizing whether or not the selected object area is the specific object area.

According to the present invention, it is possible to accurately recognize an object by efficiently selecting a specific object area as a recognition target, from a plurality of detected object areas.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
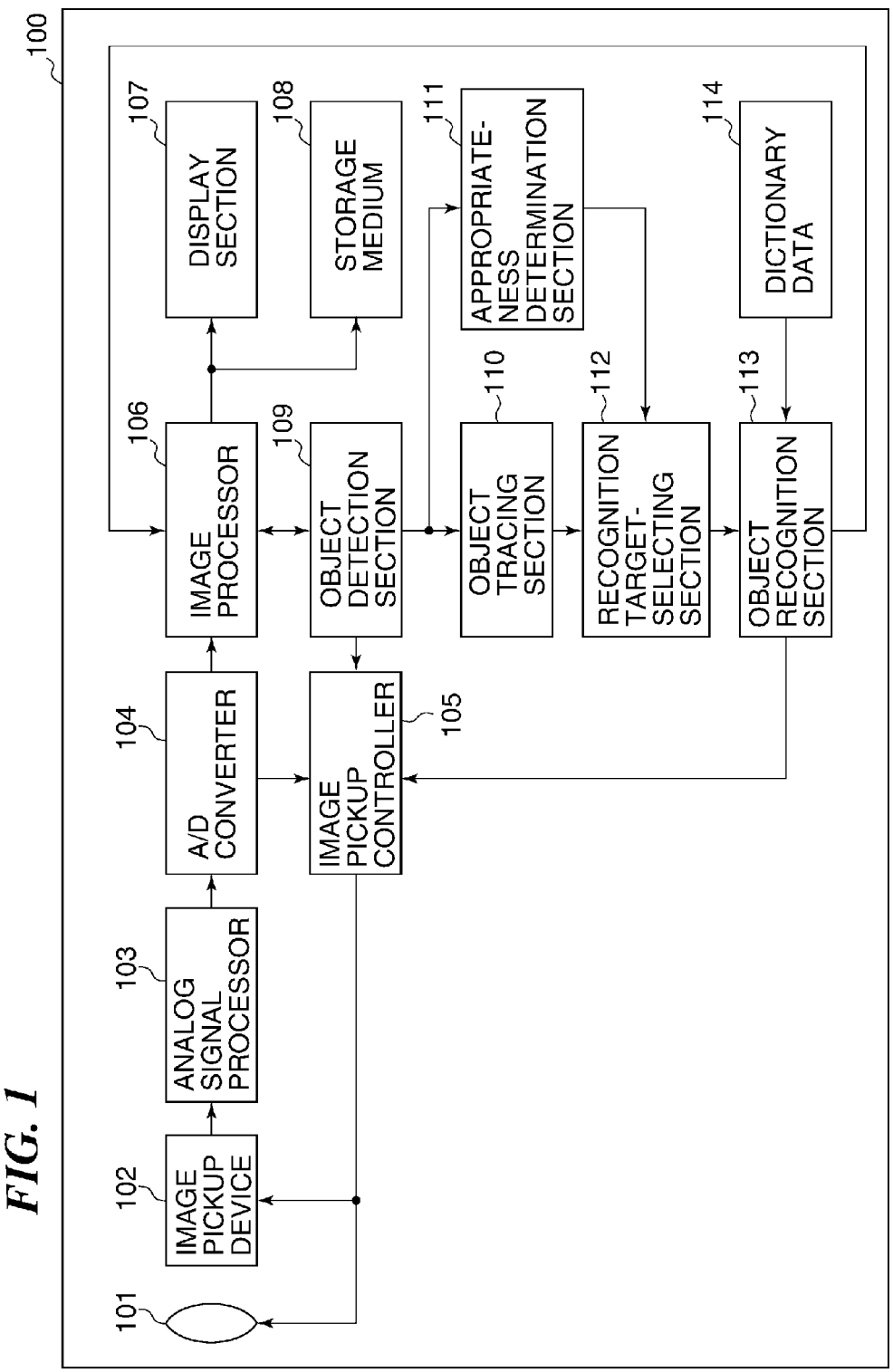
FIG. 1 is a block diagram of an image pickup apparatus including an image recognition device according to a first embodiment of the present invention.

FIG. 1 is a block diagram of an image pickup apparatus 100 including an image recognition device according to a first embodiment of the present invention.

The image pickup apparatus 100 is a digital camera (hereinafter simply referred to as the "camera"), for example. The camera 100 detects e.g. a face area of a person from image data obtained as a result of image pickup, as a specific object area. The camera 100 is equipped with a person recognition function for extracting feature information of the face area and thereby identifying a person appearing in the face area.

The camera 100 is provided with a photographic lens unit 101, and an optical image (object image) having passed through the photographic lens unit 101 is formed on an image pickup device 102 (e.g. a CCD image sensor or a CMOS image sensor). The image pickup device 102 outputs a video signal, which is an electric signal (analog signal), on a pixel basis, according to the optical image. The video signal output from the image pickup device 102 is subjected to analog signal processing, such as co-related double sampling (CDS), by an analog signal processor 103.

The video signal output from the analog signal processor 103 is converted to a digital signal (digital video signal) by an analog-to-digital converter 104. This digital video signal is input to an image pickup controller 105 and an image processor 106 as image data to be processed.

The image pickup controller 105 (control unit) is e.g. a CPU or a microcontroller, and controls the overall operation of the camera 100. The image pickup controller 105 loads an associated program stored in an internal ROM into a work area of an internal RAM and executes the program to thereby control relevant sections of the camera 100.

The image processor 106 performs image processing, such as gamma correction and white balancing, on the image data. Further, in addition to the function of such image processing, the image processor 106 has a function of performing image processing based on outputs from an object detection section 109 and an object recognition section 113. A processed video signal output from the image processor 106 is transmitted to a display section 107.

The display section 107 is a display device, such as an LCD (liquid crystal display) or an organic EL display, and displays an image on a screen according to the processed video signal. By sequentially displaying continuously picked-up images on the display section 107 on a time-series basis, it is possible to cause the display section 107 to function as an electronic view finder (EVF).

Further, the image processor 106 stores the processed video signal in a storage medium 108 (e.g. a removable memory card). Note that the destination of storage of the processed video signal may be an internal memory (not shown) incorporated in the camera 100 or a memory (not shown) inserted into the camera 100. Further, an external device (not shown) communicably connected to the camera 100 may be used as a storage destination.

The processed video signal (processing target image data) output from the image processor 106 is supplied to the object detection section 109. The object detection section 109 detects object images from the image data to identify the number of the object images and object areas thereof. In the present embodiment, object images detected by the object detection section 109 are human faces.

As a method of detecting object images, used by the object detection section 109, there has been proposed one which uses knowledge of human faces (such as skin color information, and information on face parts, such as eyes, noses, and mouths), or one which constructs an identification function for detecting human faces using a learning algorithm typified by a neural net. Further, to detect human faces, in general, a combination of a plurality of methods is employed so as to improve the detection rate. Specifically, there has been proposed a method of detecting a face by using wavelet transform and image feature values in Japanese Patent Laid-Open Publication No. 2002-351380.

A face detection result (face detection data) obtained through detection by the object detection section 109 is transmitted to the image pickup controller 105, an object tracing section 110, and an appropriateness determination section 111. The face detection data includes e.g. a position of a detected face, a size thereof, an inclination (orientation) of the face with respect to the front, and reliability of the detection result. During face detection, to detect orientations of a face, such as those of a front face and a side face, the object detection section 109 includes identification devices equal in number to the number of orientations of the face to be detected. The object detection section 109 identifies an identification device used for detecting a face area, to thereby obtain face orientation information indicating the orientation of the face.

By the way, when image data has a plurality of frames, as in the case of moving image data, the object detection section 109 detects an object area (face area) on a frame basis at a predetermined repetition period. Alternatively, the object detection section 109 detects an object area using image data in a latest frame immediately after completion of detection of a preceding object area. In this case, time periods required to detect object areas are different depending on the sizes of objects and the number of the objects, so that the repetition period at which an object area is detected is not always constant.

The object tracing section 110 traces an object image by comparing respective face areas detected in different frames and associating face areas of the same object with each other. That is, the object tracing section 110 traces an object by determining to which face area detected in the preceding frame corresponds a face area detected in the present frame. At this time, the object tracing section 110 compares a plurality of respective face areas detected in the present frame and a plurality of respective face areas detected in the preceding frame, and determines that two face areas similar in size and position to each other belong to the same object image, i.e. a face of the same person.

As described above, the object tracing section 110 traces the same object image (i.e. face area) according to face detection data, and transmits a result of the tracing to a recognition target-selecting section 112.

The appropriateness determination section 111 determines whether or not face areas detected by the object detection section 109 are appropriate as objects to be recognized by the object recognition section 113. For example, to determine the appropriateness of each face area, the appropriateness determination section 111 uses the reliability of a detection result, the size of the face area, and the orientation of a face in the face area, which can be determined from the face detection data of the face area.

In a case where the reliability of the detection result is low, it is considered that the face area can include an obstacle that hides a face therein. Therefore, when the reliability of the detection result is lower than a predetermined reliability threshold value, the appropriateness determination section 111 determines that the face area is not appropriate as a recognition target.

Further, in a case where the size of the face area is small, it is sometimes impossible to obtain a sufficient resolution as an image to be recognized by the object recognition section 113. Therefore, when the size of the face area is smaller than a predetermined size threshold value, the appropriateness determination section 111 determines that the face area is not appropriate as a recognition target.

Further, in a case where the orientation of a face, such as a side face, in the face area, is largely deviated from a front orientation (orientation of a front face), it is sometimes impossible to obtain sufficient feature data for the object recognition section 113 to identify a person in comparison with the front face. Therefore, when the difference between the orientation of a front face and the orientation of a face in an actual face area is larger than a predetermined difference threshold value, the appropriateness determination section 111 determines that the face area is not appropriate as the recognition target.

As described above, the appropriateness determination section 111 determines based on the face detection data whether or not a face area is appropriate as the recognition target, and transmits a result of the determination to the recognition target-selecting section 112.

The recognition target-selecting section 112 selects a face area to be used by the object recognition section 113 as the recognition target, based on an appropriateness determination result obtained by the appropriateness determination section 111 and a tracing result (face area) obtained by the object tracing section 110. Note that the tracing result includes selection information indicative of whether or not the face area has been selected from a past frame as the recognition target, and if selected, from which frame the face area has been selected.

The number of face areas selected as recognition targets may be one or more in one frame. For example, if a larger number of face areas than the number of face areas that can be set at a time as recognition targets have been detected, the recognition target-selecting section 112 preferentially selects, as the recognition target, a face area which is determined to be appropriate as a result of appropriateness determination and at the same time is determined, from a tracing result, not to have ever been selected. On the other hand, if there is no face area determined, from a tracing result, not to have ever been selected, the recognition target-selecting section 112 preferentially selects a face area which is determined to be appropriate and at the same time has not been selected for a longest time period since it was selected last time as a recognition target. The lapse of the time period may be computed based on time information indicative of time when the face area was selected last time as the recognition target or may be computed based on the number of frames counted starting from a time point when it was selected as the recognition target.

Further, in a case where there is no appropriate recognition target, as a matter of course, the recognition target-selecting section 112 does not select any recognition target.

A face area selected as the recognition target by the recognition target-selecting section 112 is transmitted to the object recognition section 113. From the face area, the object recognition section 113 extracts feature information indicative of features of the face area. The recognition target-selecting section 112 obtains a recognition evaluation value indicative of the degree of similarity by comparing the feature information and registered feature information of face areas registered in dictionary data 114 in advance.

The object recognition section 113 determines, based on the recognition evaluation value, to which of the face areas registered in the dictionary data 114 corresponds the face area as the recognition target. For example, when the recognition evaluation value is not smaller than a predetermined recognition threshold value, the object recognition section 113 determines that a registered face area from which the recognition threshold value has been obtained is the face area as the recognition target, and transmits a result of recognition to the image pickup controller 105.

Image data of a plurality of face areas are registered in the dictionary data 114 in a manner associated with feature information (feature values) indicative of features of the face areas. Further, a plurality of image data items of the same face area may be registered in the dictionary data 114 with respective different orientations thereof.

The image pickup controller 105 controls a focus control mechanism and an exposure control mechanism (neither of which is shown) included in the photographic lens unit 101 based on the digital video signal. In doing this, the image pickup controller 105 controls the focus control mechanism and the exposure control mechanism using the face detection data detected by the object detection section 109 and the recognition result from the object recognition section 113. In short, the camera 100 performs image pickup processing by controlling image pickup conditions while taking into account specific object areas (face areas) of a photographed image. Note that the image pickup controller 105 performs control of timing of output from the image pickup device 102 and read-out pixels.

Figure 2:
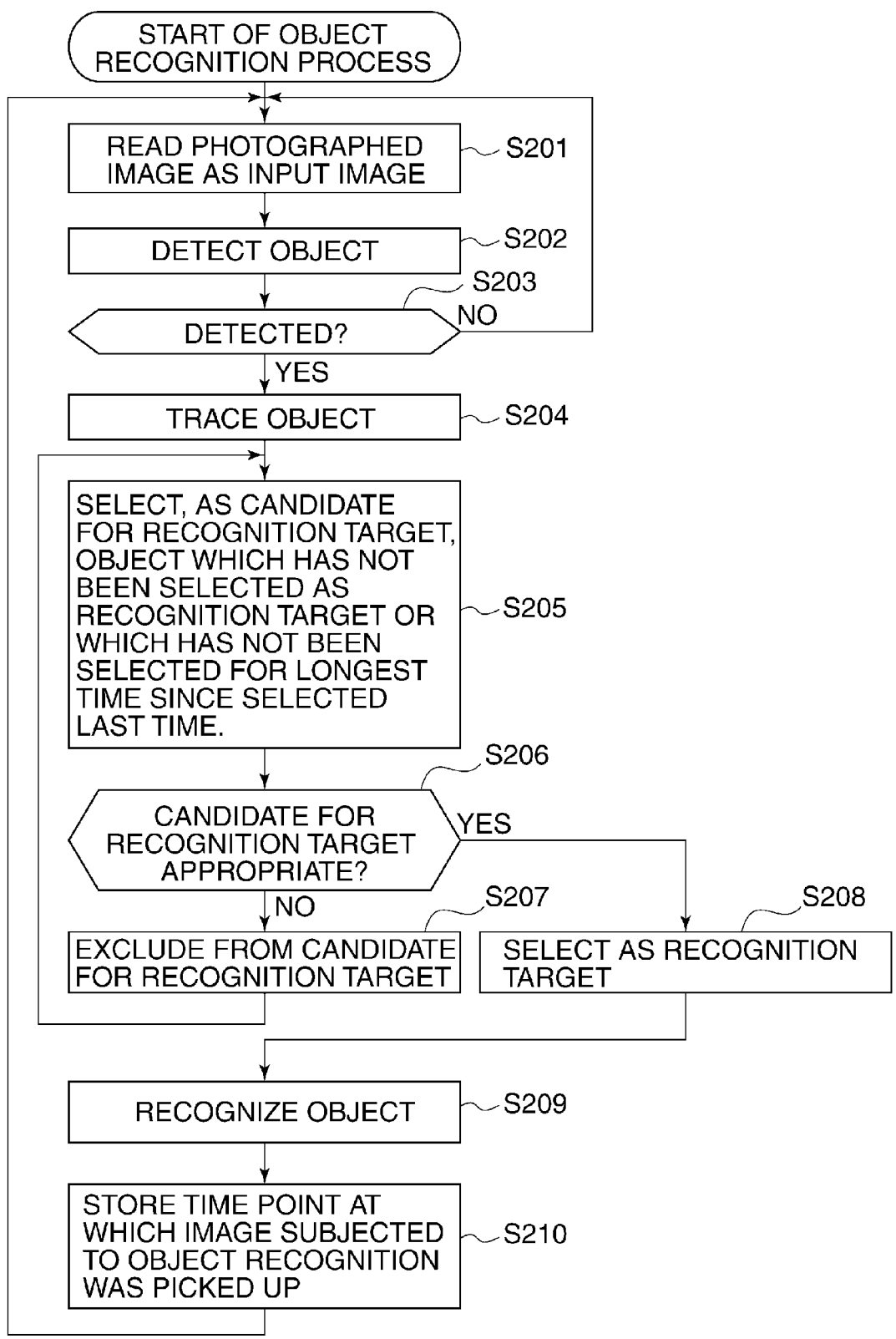
FIG. 2 is a flowchart of an object recognition process executed by a camera shown in FIG. 1.

FIG. 2 is a flowchart of an object recognition process executed by the camera 100 shown in FIG. 1.

When the object recognition process is started, the image processor 106 reads a digital video signal from the analog-to-digital converter 104 as input image data (step S201), and then outputs the processed video signal (processed image data) to the object detection section 109.

Next, the object detection section 109 detects, from the present frame, any face area(s) each as a recognition target of the input image (step S202), and determines whether or not any face area has been detected (step S203). If it is determined that no face area has been detected (NO to the step S203), the object tracing section 110 and the object recognition section 113 do not perform processing on input image data of the present frame, but the present process returns to the step S201, wherein the image processor 106 reads input image data of a next frame.

If it is determined that at least one face area has been detected (YES to the step S203), the object detection section 109 outputs face detection data together with the face area(s) to the object tracing section 110 and the appropriateness determination section 111. Note that as described hereinabove, the face detection data includes the number of face areas, the positions, sizes, and face orientations of images in the face areas, as well as reliability of each detection result.

The object tracing section 110 traces a face area by determining the same face area between different frames (step S204). In tracing a face area, if the degrees of similarity of the position and size of the face area, represented by the face detection data, between consecutive frames having been subjected to face detection, satisfy a predetermined reference, as described hereinabove, the object tracing section 110 determines that the face area is the same between the frames.

On the other hand, when the degrees of similarity of the position and size of the face area, represented by the face detection data, between the consecutive frames having been subjected to face detection, do not satisfy the predetermined reference, the object tracing section 110 determines that the face area has newly appeared. Note that if the object tracing section 110 identifies the same face area between the frames consecutive in time series, it is possible to obtain selection information of the face area which has been selected as the recognition target in the past frames.

Then, the recognition target-selecting section 112 selects face areas which each have not been selected as a recognition target, from the face areas, as candidates for the recognition target. If there is no unselected face area, the recognition target-selecting section 112 selects a face area which has not been selected for a longest time period since it was selected last time as a recognition target, as a candidate for the recognition target (step S205).

Next, the recognition target-selecting section 112 determines whether or not each candidate for the recognition target is appropriate, according to the determination result sent from the appropriateness determination section 111 (step S206). If it is determined that the candidate is not appropriate (NO to the step S206), the recognition target-selecting section 112 excludes the inappropriate candidate from the candidates for the recognition target (step S207). Then, the recognition target-selecting section 112 executes the process in the step S205 on the remaining face areas selected as the candidates.

On the other hand, if it is determined that the candidate is appropriate (YES to the step S206), the recognition target-selecting section 112 finally selects the candidate face area as the recognition target (step S208). Then, the object recognition section 113 extracts feature information of the face area selected as the recognition target by the recognition target-selecting section 112, and recognizes the face area by comparing the feature information and feature information of registered images (registered face areas) registered in advance in the dictionary data 114 (step S209).

After termination of the recognition, the object recognition section 113 notifies the image processor 106 of the fact. The image processor 106 stores the current time or the frame number in a memory (not shown) for the face area which has been subjected to object recognition (face recognition) in preparation for selection processing to be performed for a next frame by the recognition target-selecting section 112 (step S210). Then the present process returns to the step S201, wherein the image processor 106 executes the above-described processing.

Note that the current time may be a time point at which a picked-up image is read in as input image data or may be a time point at which the object recognition section 113 executes recognition processing. In the latter case, the object recognition section 113 notifies the image processor 106 of the time point at which the recognition processing has been executed. The same applies to a case where the current frame is used in place of the current time.

Figure 3:
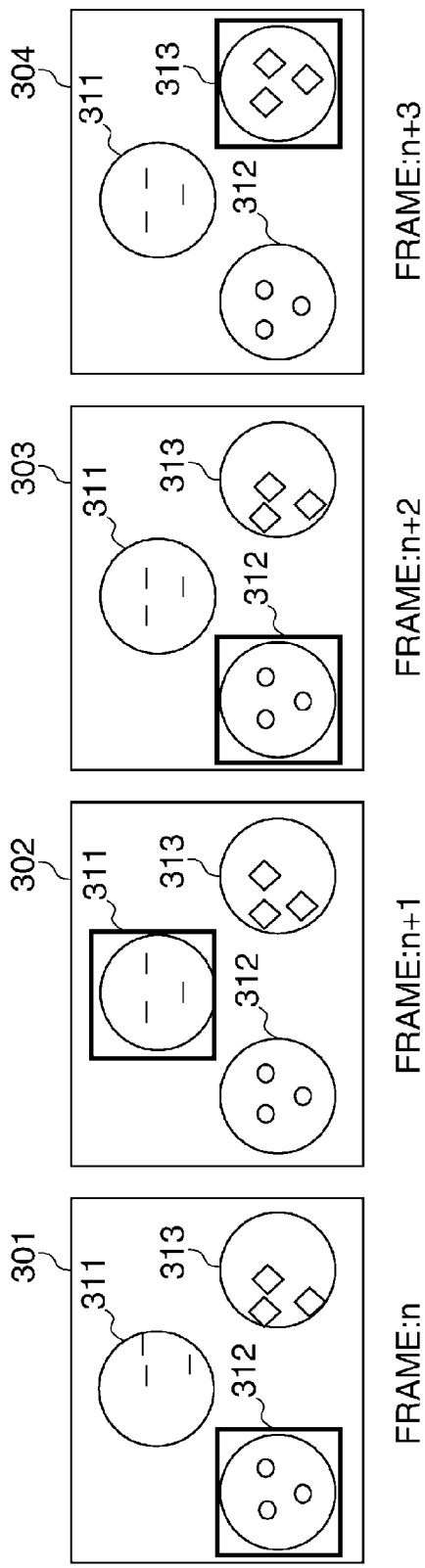
FIG. 3 is a diagram useful in explaining selection processing executed by a recognition target-selecting section shown in FIG. 1.

FIG. 3 is a diagram useful in explaining the selection process executed by the recognition target-selecting section 112 appearing in FIG. 1. Here, a description will be given of a case where image data items of an nth frame 301 to an (n+3) frame 304 (n is an integer not smaller than 1) are sequentially input to the image processor 106. Here, it is assumed that the object detection section 109 can detect face areas on a frame basis, for ease of explanation given below.

In FIG. 3, let it be assumed that the object detection section 109 detects face areas 311, 312, and 313 in the nth frame 301 to the (n+3)th frame 304, respectively, and the object tracing section 110 identifies the face areas 311, 312, and 313 as faces of the respective same objects between the nth frame 301 to the (n+3)th frame 304.

The face area 312 in the nth frame 301, the face area 311 in the (n+1)th frame 302, the face area 312 in the (n+2)th frame 303, and the face area 313 in the (n+3)th frame 304 (face areas each surrounded by a solid-line frame) are face areas each selected as a recognition target by the recognition target-selecting section 112. The object recognition section 113 executes recognition processing for recognizing objects (i.e. persons) on the face areas each surrounded by the solid-line frame.

Note that it is assumed here that the recognition target-selecting section 112 selects one face area at the maximum from each frame as a recognition target. Further, the appropriateness determination section 111 uses face orientations obtained as face detection data, for determination of appropriateness, and determines that a face area oriented toward the front (e.g. the face area 312 in the nth frame 301) is appropriate as a recognition target. On the other hand, the appropriateness determination section 111 determines that a face area oriented sideways (e.g. a face area 311 in the nth frame 301) is not appropriate as a recognition target.

In the nth frame 301, it is assumed that each of the detected face areas 311, 312, and 313 is a face area which has not been selected as a recognition target before. More specifically, the nth frame 301 is a first frame, and hence the detected face areas 311, 312, and 313 have not been selected in the past (do not have selection information added thereto). Therefore, the recognition target-selecting section 112 selects the face areas 311, 312, and 313 as candidates for the recognition target in the frame 301.

At this time, the face areas 311 and 313 are oriented sideways, and hence the appropriateness determination section 111 determines that they are inappropriate, whereby the recognition target-selecting section 112 selects only the face area 312 as the recognition target.

In the (n+1)th frame 302, the detected face areas 311 and 313 are face areas which have not been selected as recognition targets in the past, and hence the recognition target-selecting section 112 selects them as candidates for the recognition target in the frame 302. At this time, since the face area 313 is oriented sideways, the appropriateness determination section 111 determines that it is inappropriate, so that the recognition target-selecting section 112 selects only the face area 311 as the recognition target.

In the (n+2)th frame 303, since the detected face area 313 is a face area which has not been selected as a recognition target in the past, the recognition target-selecting section 112 selects the face area 313 as a candidate for the recognition target in the frame 303. At this time, the face area 313 is oriented sideways, and hence the appropriateness determination section 111 determines that the face area 313 is inappropriate, so that the recognition target-selecting section 112 excludes the face area 313 from the recognition target.

In this case, the recognition target-selecting section 112 selects one of the face areas 311 and 312, which has not been selected for a longest time period since it was selected last time as a recognition target, as the recognition target in the frame 303. More specifically, the face area 311 was selected in the (n+1)th frame 302 as a recognition target, and the face area 312 was selected in the nth frame 301 as a recognition target, so that the recognition target-selecting section 112 selects the face area 312 as the recognition target in the (n+2)th frame 303.

In the (n+3)th frame 304, since the detected face area 313 is a face area which has not been selected as a recognition target, the recognition target-selecting section 112 selects the face area 313 as a candidate for the recognition target in the frame 304. At this time, the face area 313 is oriented toward the front, and hence the appropriateness determination section 111 determines that the face area 313 is appropriate, so that the recognition target-selecting section 112 selects the face area 313 as the recognition target in the frame 304.

Note that although in the example illustrated in FIG. 3, it is assumed that one face area at the maximum is selected as a recognition target in each frame, two or more face areas may be selected as recognition targets in one frame. Further, if the appropriateness determination section 111 determines that all the face areas are inappropriate, the recognition target-selecting section 112 does not select any face area as a recognition target. In this case, the steps 209 to 210 in FIG. 2 are not executed.

Further, let it be assumed that in the case of selecting m (m is an integer not smaller than 1) object areas (e.g. face areas) at the maximum as recognition targets in each frame, there are more than m candidates for the recognition targets. Under such conditions, if it is determined that all of the more than m candidates are appropriate as the recognition targets, it is necessary to reduce the number of the more than m recognition targets to m.

In this case, the recognition targets are decided based on respective evaluation values calculated from positions where the object areas have been detected in an image, the sizes of the object areas, or the like. More specifically, when the number of the object areas selected as the recognition targets exceeds a predetermined threshold value, the recognition target-selecting section 112 reduces the number of the object areas selected as the recognition targets to a value not larger than the predetermined threshold value, based on at least one of the position and the size of each recognition target in the image.

As described above, in the first embodiment of the present invention, in selecting a recognition target for object recognition, an object area determined to be inappropriate for use in the object recognition is excluded from the recognition target. This makes it possible not only to improve the success rate in object recognition but also to perform efficient recognition processing.

Next, an image pickup apparatus according to a second embodiment of the present invention will be described.

Figure 4:
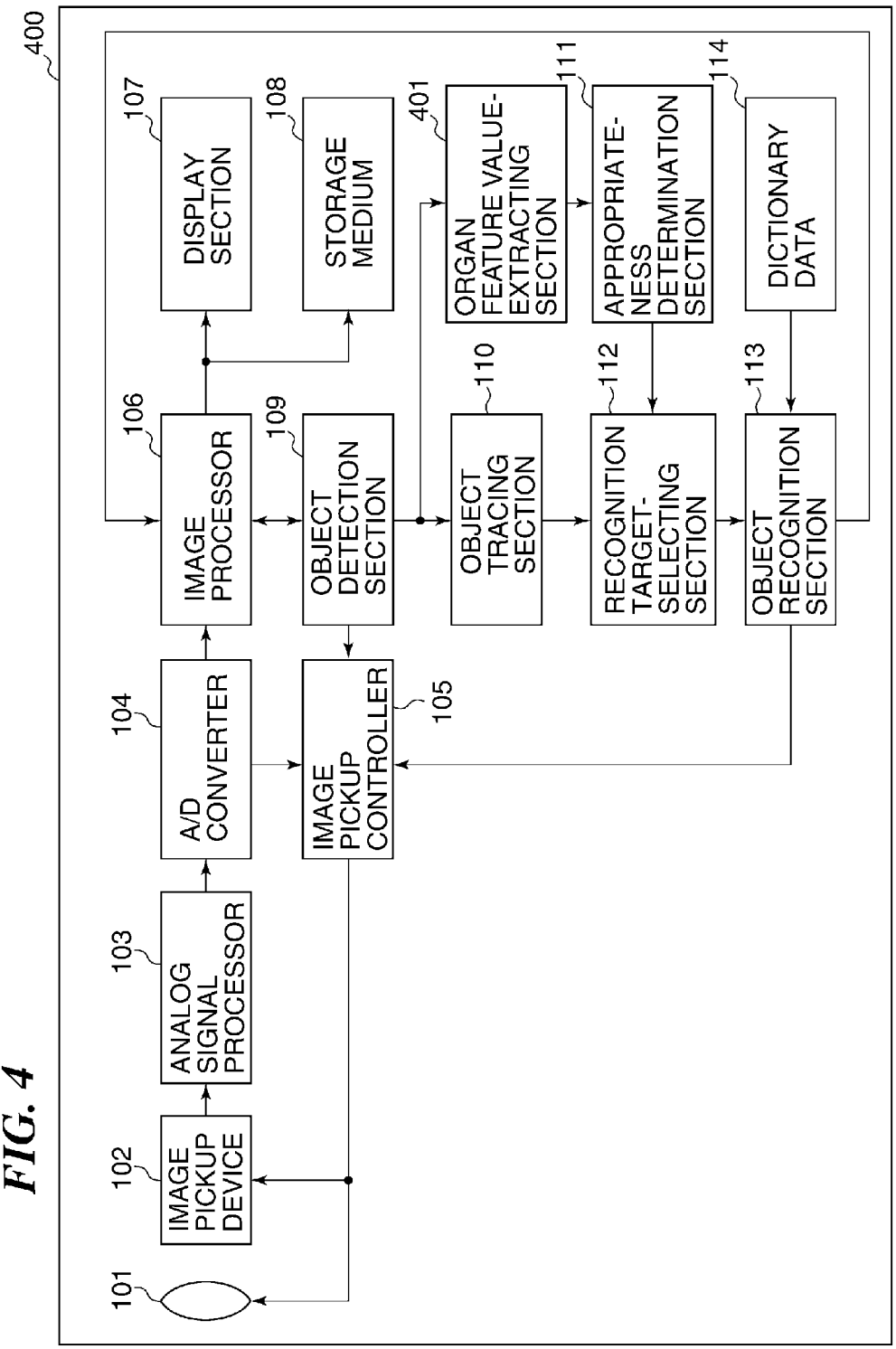
FIG. 4 is a block diagram of an image pickup apparatus including an image recognition device according to a second embodiment of the present invention.

FIG. 4 is a block diagram of the image pickup apparatus 400 according to the second embodiment of the present invention. Note that in FIG. 4, the same component elements as those of the camera 100 shown in FIG. 1 are denoted by the same reference numerals, and description thereof is omitted.

Referring to FIG. 4, the camera 400 is distinguished from the camera 100 in that the camera 400 further comprises an organ feature value-extracting section 401. Image data including face areas detected by the object detection section 109 are input to the organ feature value-extracting section 401. The organ feature value-extracting section 401 extracts organ feature values from the image data, and outputs the same as organ feature data.

In the present embodiment as well, the face areas of persons are detected, and hence the organ feature value-extracting section 401 extracts a degree of opening of eyes, an orientation of a face, and the like, in each face area, as the organ feature values. In extracting the organ feature values, the organ feature value-extracting section 401 fits a three-dimensional model of the face to image data, i.e. the face area, and extracts organ feature points in the face area. Then, the organ feature value-extracting section 401 outputs feature values, such as a degree of opening of eyes and an orientation of the face, according to a geometric relationship between the extracted organ feature points, as organ feature data.

Note that in the above-described first embodiment, it is assumed that face detection data output from the object detection section 109 includes information indicative of orientations of respective faces. On the other hand, in the second embodiment, the organ feature value-extracting section 401 extracts detailed features of organs in each face area detected by the object detection section 109, and determines an orientation of each face based on the respective shapes of the organs and a relative position therebetween. For example, the shape of a nose is different between a face oriented toward the front and a face oriented sideways, which causes a difference between the relationship between the center position of the two eyes and the relative position between a mouth and the nose. Therefore, a face orientation extracted as a feature value by the organ feature value-extracting section 401 is higher in accuracy than a face orientation output from the object detection section 109.

The organ feature data is given to the appropriateness determination section 111. The appropriateness determination section 111 determines, based on the organ feature data, whether or not an associated face area is appropriate as a recognition target. For example, when the organ feature data indicates that the degree of opening of eyes in the face area is small as in an eyes-closed state, it is difficult to accurately recognize a person in comparison with a case where the degree of opening of eyes is large. Therefore, when the degree of opening of eyes of the face area is smaller than a predetermined opening threshold value, the appropriateness determination section 111 determines that the face area is inappropriate as the recognition target.

Further, when a face area has a large degree of sideways face orientation (i.e. in a state of a face directed away from the front direction through a large angle), it is difficult to accurately perform person recognition in comparison with a case where the face area has a small degree of sideways face orientation. Therefore, when the degree of sideways face orientation of the face area is larger than a predetermined orientation threshold value, the appropriateness determination section 111 determines that the face area is inappropriate as the recognition target.

As described above, in the second embodiment of the present invention, in determining whether or not a detected object area is appropriate as a recognition target, organ feature data is used, so that it is possible to improve accuracy of appropriateness determination. This makes it possible to accurately determine that the object area is not appropriate as the recognition target, and exclude the object area from recognition target(s), whereby it is possible to improve the success rate in recognition of an object (i.e. person) and further to perform efficient recognition processing.

Next, an image pickup apparatus according to a third embodiment of the present invention will be described.

Figure 5:
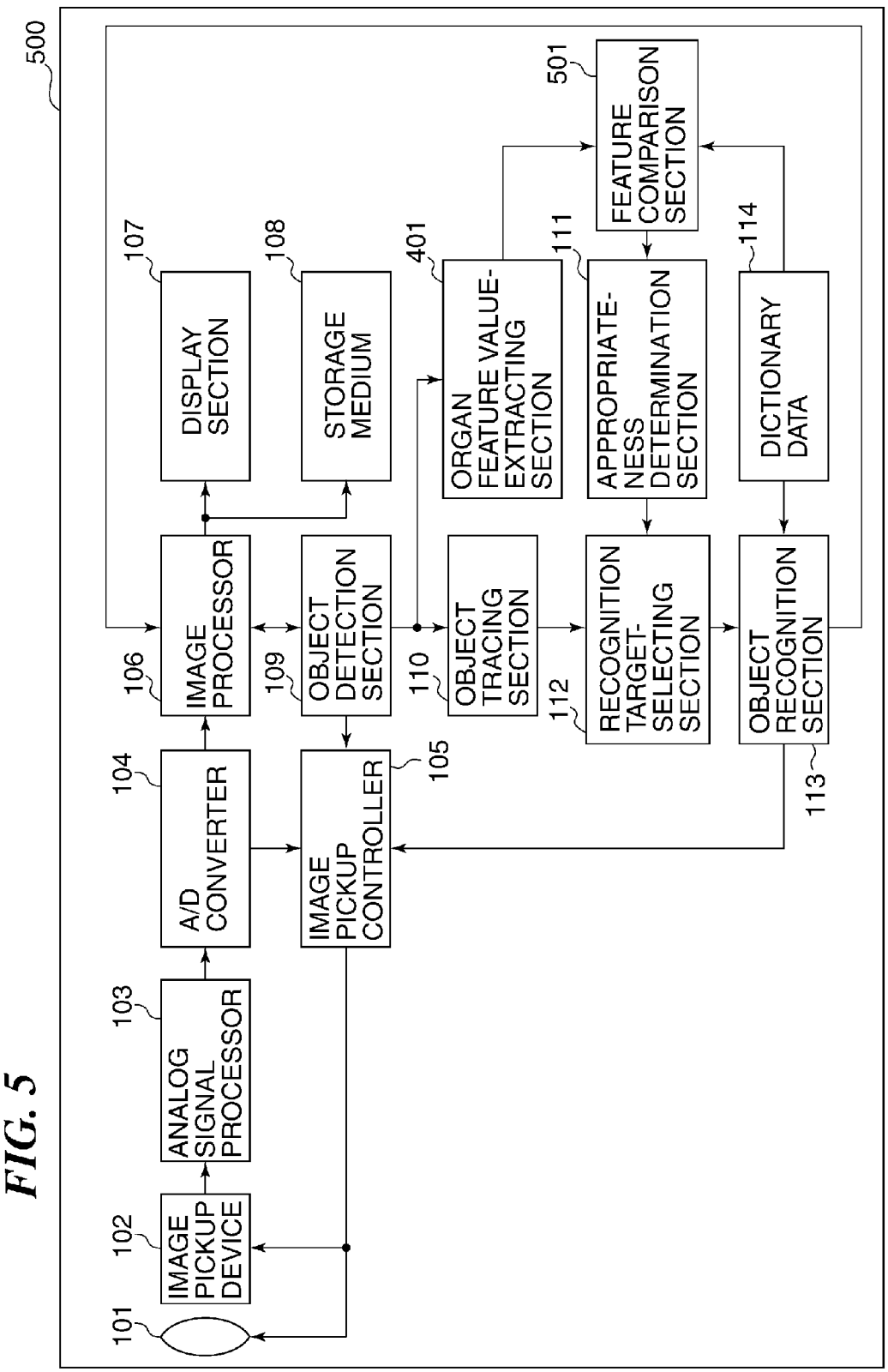
FIG. 5 is a block diagram of an image pickup apparatus including an image recognition device according to a third embodiment of the present invention.

FIG. 5 is a block diagram of the image pickup apparatus 500 according to the third embodiment of the present invention. Note that in FIG. 5, the same component elements as those of the cameras 100 and 400 shown in FIGS. 1 and 4 are denoted by the same reference numerals, and description thereof is omitted.

Referring to FIG. 5, the camera 500 is distinguished from the camera 400 in that the camera 500 further comprises a feature comparison section 501. The feature comparison section 501 receives organ feature data from the organ feature value-extracting section 401, and receives, from the dictionary data 114, registered feature information (also referred to as "registered feature data") registered in the dictionary data 114. Then, the feature comparison section 501 compares the organ feature data and the registered feature data, to thereby determine whether or not the organ feature data and the registered feature data match each other.

Note that in the third embodiment, images of face areas or image feature values (object recognition information) for use in recognizing an object and face organ feature data are registered in the dictionary data 114 in a manner associated with each other. In the following description, the image feature values for use in object recognition and the face organ feature data or images of the face areas, registered in the dictionary data 114, are collectively referred to as the "registered image information".

The appropriateness determination section 111 determines whether or not detected image data (i.e. face area) is appropriate as a recognition target, based on a result of the comparison by the feature comparison section 501. As a result of the comparison, if it is determined that the organ feature data and the registered feature data match each other, the appropriateness determination section 111 determines that the detected image data is appropriate as the recognition target. On the other hand, if it is determined that the organ feature data and the registered feature data do not match each other, the appropriateness determination section 111 determines that the detected image data is not appropriate as the recognition target.

More specifically, person recognition is influenced by a person's face state including a facial expression and a face orientation in a face area, and therefore when the feature value of a detected face area and a feature value registered in the dictionary data 114 are different, accuracy of person recognition is lowered. For this reason, the appropriateness determination section 111 determines that the face area is appropriate as a recognition target, only when the result of comparison by the feature comparison section 501 indicates a match.

Here, a description will be given of comparison determination by the feature comparison section 501. Let it be assumed, for example, that registered image information indicative of a face directed toward the right and the face directed toward the front is registered in the dictionary data 114 as registered feature data. Now, assuming that the organ feature value-extracting section 401 has extracted organ feature data indicative of the face directed toward the right from a detected face area, the feature comparison section 501 compares the registered image information and the organ feature data, and determines that the registered image information and the organ feature data match each other. As a consequence, the appropriateness determination section 111 determines that the detected face area is appropriate as a recognition target.

On the other hand, assuming that the organ feature value-extracting section 401 has extracted organ feature data indicative of the face directed toward the left from the detected face area, the feature comparison section 501 compares the registered image information and the organ feature data, and determines that the registered image information and the organ feature data do not match each other. As a consequence, the appropriateness determination section 111 determines that the detected face area is inappropriate as a recognition target.

As described above, in the third embodiment of the present invention, in determining whether or not a detected object area is appropriate as a recognition target, a result of comparison between image data registered in the dictionary data 114 and a state (i.e. feature value) of a detected object area is made use of. This makes it possible to improve the accuracy of appropriateness determination by the appropriateness determination section 111. Therefore, by accurately determining that an object area is inappropriate as a recognition target, it is possible to exclude the object area from recognition target(s), whereby it is possible to improve the success rate in person recognition and at the same time to perform efficient recognition processing.

Note that in the above-described first to third embodiments, when it is determined that feature information of an object area selected by the object recognition section 113 as a recognition target matches registered feature information registered in the dictionary data 114, the object tracing section 110 takes over the result of the determination to a next frame. As a consequence, in the following frames, the object area (i.e. face area) is not required to be subjected to a recognition process by the object recognition section 113, and is recognized as a specific object area. In short, there is no need to select the object area as a recognition target, and hence the recognition target-selecting section 112 may exclude the object area recognized as a specific object area by the object recognition section 113, from selection of the recognition target.

Further, although in the above-described first to third embodiments, the description has been given of the case where a person is recognized by detecting a face area as an object area, the present invention can be applied not only to the case of detection of a face area but also to cases where object recognition is performed so as to extract a target object area of e.g. a person, an animal, an automotive vehicle, or any target object, to identify the target object. For example, the present invention can be applied to a case where a dog as a target object is detected to identify a kind and individuality of the dog, or a case where a specific kind of an automotive vehicle is detected to identify a type of the automotive vehicle.

As described above, in the above-described embodiments of the present invention, it is possible to perform accurate object recognition by efficiently selecting from a plurality of detected object areas, a specific object area as a recognition target.

As is apparent from the above description, in the example illustrated in FIG. 1, the photographic lens unit 101, the image pickup device 102, the analog signal processor 103, and the analog-to-digital converter 104 function as an image pickup unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. Although in the above-described embodiments, the description has been given of the case where the image pickup apparatus performs object recognition, the apparatus to which the image recognition device is applied is not limited to the image pickup apparatus. For example, the image recognition device for performing object recognition may applied to a display apparatus which displays images (reproduction data) sequentially supplied e.g. from an external apparatus or a storage medium. In this display apparatus, the reproduction data is used as data for object detection processing to perform object recognition. A controller, such as a microcontroller, of the display apparatus controls display conditions for displaying an image based on information on objects recognized as such (information of the positions, sizes, and object IDs of the objects in the image). Specifically, the controller controls superimposition display of information items that indicate objects, such as frames and object IDs, at respective positions of the objects in the image, and the brightness and colors of the displayed image according to the luminance and color information of an object portion.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2012-102870 filed Apr. 27, 2012, which is hereby incorporated by reference herein in its entirety.

What is claimed is:

1. An image recognition device that recognizes a specific person from images sequentially input in time series, comprising:
    a non-transitory memory device;
    a processor;
    a face detection unit configured to detect face areas from each image;
    a determination unit configured to determine whether or not the face areas detected by said face detection unit are appropriate as a recognition target;
    a selection unit configured to select at least one face area from the face areas which has been determined to be appropriate as the recognition target with reference to a selection result in past images, wherein in a case where the number of the face areas detected by said face detection unit is larger than a predetermined number which is settable for the recognition target and an unselected face area which has not been selected as the recognition target is included in the past images, said selection unit preferentially selects the unselected face area; and
    a recognition unit configured to perform recognition processing on the at least one face area selected by said selection unit,
    wherein said face detection unit, said determination unit, said selection unit, and said recognition unit are implemented by the processor executing at least one program recorded on the non-transitory memory device, and
    wherein in a case where the number of the face areas detected by said face detection unit is larger than a predetermined number which is settable for the recognition target and an unselected face area which has not been selected as the recognition target in the past images is not included, said selection unit preferentially selects a face area which has not been selected for a longest time period since the face area was selected last time as the recognition target.

2. The image recognition device according to claim 1, further comprising a tracing unit configured to trace each face area by determining whether or not a face area detected in one image by said face detection unit exists in a next sequential image, and
    wherein when said selection unit selects the at least one face area detected in the one image by said face detection unit, as the recognition target, said selection unit excludes, from selection of the recognition target in the next image, a face area that has been determined to be the same face area as the selected at least one face area by said tracing unit,
    wherein said tracing unit is implemented by the processor executing at least one program recorded on the non-transitory memory device.

3. The image recognition device according to claim 2, wherein said selection unit selects at least one face area detected in the one image by said face detection unit, as the recognition target, and when said tracing unit determines that there is no face area which is the same as the selected face area, in the next image, said selection unit selects, out of the selected at least one face areas, a face area which has not been selected for a longest time period since the face area was selected last time as a recognition target, as the recognition target in the next image.

4. The image recognition device according to claim 1, wherein when said face detection unit detects each face area, said face detection unit outputs detection data indicative of at least one of reliability of a detection result by said face detection unit, a size of the face area, and an orientation of the face area, and
    wherein when at least one of the reliability of the detection result by said face detection unit, the size of the face area, and the orientation of the face area does not match a predetermined reference, said determination unit determines that the face area detected by said face detection unit is inappropriate as the recognition target.

5. The image recognition device according to claim 1, further comprising an extraction unit configured to extract a feature value from each face area detected by said face detection unit, as feature data, and
wherein said determination unit determines, based on the feature data extracted by said extraction unit, whether or not the face area detected by said face detection unit is appropriate as the recognition target,
wherein said extraction unit is implemented by the processor executing at least one program recorded on the non-transitory memory device.

6. The image recognition device according to claim 5, further comprising:
a dictionary unit configured to register therein, as registered image information, a plurality of images of face areas or object recognition information obtained from the images, and feature data indicative of features of the face areas, in a manner associated with each other; and
a feature comparison unit configured to compare the registered image information registered in said dictionary unit and the feature data extracted by said extraction unit,
wherein said determination unit determines based on a result of comparison by said feature comparison unit whether or not each face area detected by said face detection unit is appropriate as the recognition target, and
wherein said dictionary unit and said feature comparison unit are implemented by the processor executing at least one program recorded on the non-transitory memory device.

7. The image recognition device according to claim 5, wherein said extraction unit extracts at least one of an orientation of each face area with respect to the front direction and a personal facial expression in the face area, as the feature data.

8. An image pickup apparatus comprising:
an image pickup device configured to photograph an object to thereby pick up images of the object;
an image recognition device that recognizes a specific person from the images sequentially input in time series from said image pickup device, including:
a non-transitory memory device,
a processor,
a face detection unit configured to detect face areas from each image,
a determination unit configured to determine whether or not the face areas detected by said face detection unit are appropriate as a recognition target,
a selection unit configured to select at least one face area from the face areas which has been determined to be appropriate as the recognition target with reference to a selection result in past images, wherein in a case where the number of the face areas detected by said face detection unit is larger than a predetermined number which is settable for the recognition target and an unselected face area which has not been selected as the recognition target is included in the past images, said selection unit preferentially selects the unselected face area, and
a recognition unit configured to perform recognition processing on the at least one face area selected by said selection unit; and
a controller configured to control image pickup conditions for picking up images by said image pickup device, according to the specific person recognized by said image recognition device,
wherein said face detection unit, said determination unit, said selection unit, and said recognition unit are implemented by the processor executing at least one program recorded on the non-transitory memory device, and
wherein in a case where the number of the face areas detected by said face detection unit is larger than a predetermined number which is settable for the recognition target and an unselected face area which has not been selected as the recognition target in the past images is not included, said selection unit preferentially selects a face area which has not been selected for a longest time period since the face area was selected last time as the recognition target.

9. A display device comprising:
a display device configured to display images input in time series;
an image recognition device that recognizes a specific person from the images sequentially input in time series from an image pickup device, including:
a non-transitory memory device;
a processor;
a face detection unit configured to detect face areas from each image,
a determination unit configured to determine whether or not the face areas detected by said face detection unit are appropriate as a recognition target,
a selection unit configured to select at least one face area from the face areas which has been determined to be appropriate as the recognition target with reference to a selection result in past images, wherein in a case where the number of the face areas detected by said face detection unit is larger than a predetermined number which is settable for the recognition target and an unselected face area which has not been selected as the recognition target is included in the past images, said selection unit preferentially selects the unselected face area, and
a recognition unit configured to perform recognition processing on the at least one face area selected by said selection unit; and
a controller configured to control display conditions for displaying each image on said display device according to the specific person recognized by said image recognition device,
wherein said face detection unit, said determination unit, said selection unit, and said recognition unit are implemented by the processor executing at least one program recorded on the non-transitory memory device, and
wherein in a case where the number of the face areas detected by said face detection unit is larger than a predetermined number which is settable for the recognition target and an unselected face area which has not been selected as the recognition target in the past images is not included, said selection unit preferentially selects a face area which has not been selected for a longest time period since the face area was selected last time as the recognition target.

10. A method of controlling an image recognition device that recognizes a specific person from images sequentially input in time series, comprising:
detecting face areas from each image;
determining whether or not each detected face area is appropriate as a recognition target;

selecting at least one face area from the detected face areas which has been determined to be appropriate as the recognition target with reference to a selection result in past images, wherein in a case where the number of detected face areas is larger than a predetermined number which is settable for the recognition target and an unselected face area which has not been selected as the recognition target is included in the past images, the unselected face area is preferentially selected; and performing recognition processing on the selected at least one face area, wherein in a case where the number of the detected face areas is larger than a predetermined number which is settable for the recognition target and an unselected face area which has not been selected as the recognition target in the past images is not included, a face area which has not been selected for a longest time period since the face area was selected last time is preferentially selected as the recognition target.

11. A non-transitory computer-readable storage medium storing a computer-executable control program for causing a computer to execute a method of controlling an image recognition device that recognizes a specific person from images sequentially input in time series, wherein the method comprises:

detecting face areas from each image;

determining whether or not each detected face area is appropriate as a recognition target;

selecting at least one face area from the detected face areas which has been determined to be appropriate as the recognition target with reference to a selection result in past images, wherein in a case where the number of detected face areas is larger than a predetermined number which is settable for the recognition target and an unselected face area which has not been selected as the recognition target is included in the past images, the unselected face area is preferentially selected; and performing recognition processing on the selected at least one face area, wherein in a case where the number of the detected face areas is larger than a predetermined number which is settable for the recognition target and an unselected face area which has not been selected as the recognition target in the past images is not included, a face area which has not been selected for a longest time period since the face area was selected last time is preferentially selected as the recognition target.

12. The image recognition device according to claim 1, wherein in a first image, a first detected face area is determined to be inappropriate as the recognition target by said determination unit, and in a second image following the first image, a second detected face area is determined to be appropriate as the recognition target by said determination unit, the second detected face area including the same face as the first detected face area.

* * * * *